United States Patent [19]
Schlenz, deceased

[11] 3,744,634
[45] July 10, 1973

[54] PACKAGE SEWAGE TREATMENT PLANT

[76] Inventor: Harry E. Schlenz, deceased, late of West County Line Rd., Barrington, Ill. 60010 by Norma A. Schlenz, executrix

[22] Filed: Feb. 25, 1971

[21] Appl. No.: 118,865

[52] U.S. Cl.............. 210/151, 210/197, 210/205, 210/256, 210/534
[51] Int. Cl............................................. B01d 21/02
[58] Field of Search.................. 210/63, 151, 197, 210/205, 520, 534, 256, 7, 17, 14

[56] References Cited
UNITED STATES PATENTS

| | | | |
|---|---|---|---|
| 3,448,861 | 6/1969 | Berk | 210/14 X |
| 3,466,241 | 9/1969 | Simpson | 210/17 |
| 3,335,081 | 8/1967 | El-Naggar | 210/151 X |
| 3,534,857 | 10/1970 | Berk | 210/151 |

Primary Examiner—Samih N. Zaharna
Assistant Examiner—F. F. Calvetti
Attorney—Fidler, Patnaude & Batz

[57] ABSTRACT

The self-contained package plant includes an annular aerobic, biological treating channel into which the raw sewage is fed and continually driven around the channel by a plurality of rotating perforated discs which also function to aerate and agitate the contents of the channel. A central, sludge tank is located within the space defined by the channel, and controlled recirculation of activated liquid from the settling tank to the annular channel is effected by one of the discs. The clarified effluent from the settling tank is taken from a weir trough adjustably mounted in the upper portion of the sludge tank.

3 Claims, 3 Drawing Figures

INVENTOR
HARRY E. SCHLENZ, DECEASED
BY NORMA A. SCHLENZ, EXECUTRIX
BY
ATTORNEYS

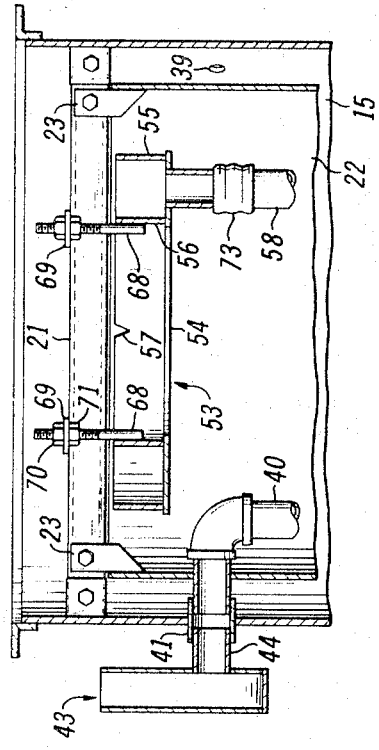
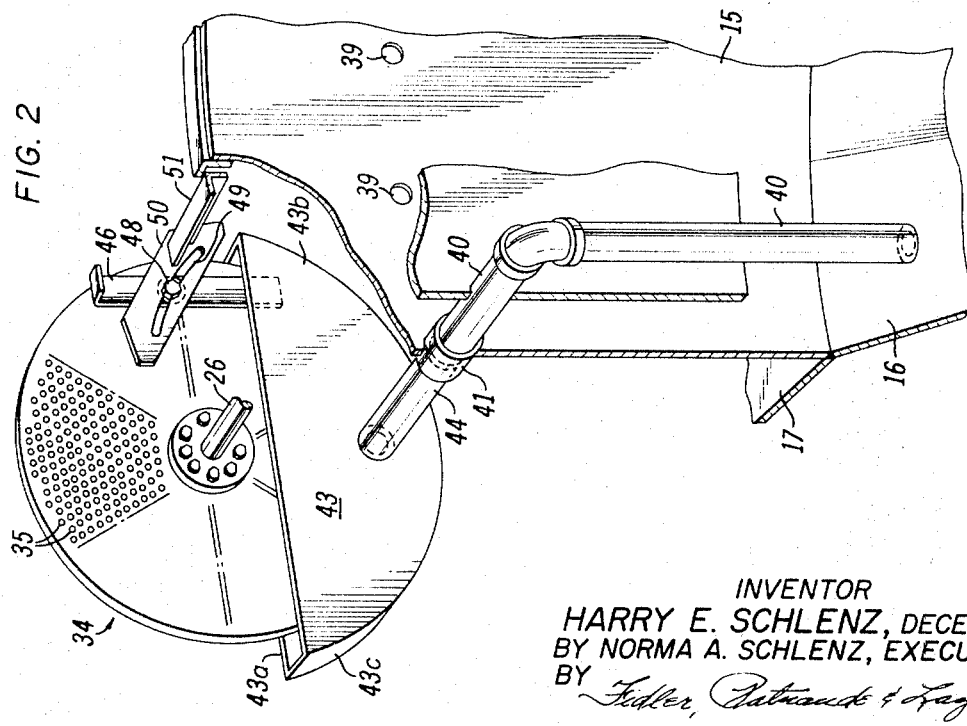

PACKAGE SEWAGE TREATMENT PLANT

The present invention generally relates to a novel method and apparatus for treating sewage, and it relates more particularly to the type of apparatus known in the art as a package plant.

In the past, perhaps the most commonly used systems for treating and purifying small amounts of sewage generated by populations up to about two hundred have employed septic tanks and associated septic fields or cesspools. Such systems have the disadvantages that they require a considerable amount of space and are not very effective under some climatic conditions. In fact, the use of such systems is not outlawed in many areas and their use curtailed in others.

Attempts have been made to build relatively small sewage treating plants which operate in substantially the same manner as the large municipal type sewage treating plants. Not only have such systems been relatively expensive to manufacture and install, but the operating cost has been extremely high since they require frequent adjustment and, consequently, an attendant who is skilled in the operation of sewage treating systems.

There is, therefore, a need for an efficient treating system for treating small amounts of sewage as is discharged, for example, from private homes, motels, restaurants, small manufacturing plants and the like. Preferably, such a system should be self-contained, economical to manufacture and maintain, and it should operate automatically so as not to require the attention of an operator. With regard to economy of manufacture, it would be desirable to manufacture and test the equipment at a manufacturing facility and then ship the complete plant, intact, to the use site.

Therefore, an object of the present invention is to provide a new and improved method and apparatus for treating sewage.

Another object of the present invention is to provide a new and improved, self-contained sewage treating package plant which is compact in size and inexpensive to manufacture, operate and maintain.

Still another object of the present invention is to provide a sewage treatment package plant which is entirely aerobic in nature whereby to minimize obnoxious odors.

A further object of the present invention is to provide a new and improved mechanism for recirculating activated sewage from a sludge settling tank to an aerobic biological treating tank.

Briefly, the above and further objects may be realized in accordance with the teachings of the present invention by providing a settling tank surrounded by an annular channel into which one or more motor driven, rotatable discs depend so as to aerate, agitate, and circulate sewage contained in the channel. An angularly adjustable trough is disposed over the lower portion of one of the discs and is connected to an intermediate level in the settling tank whereby the disc and trough function as a pump to recirculate partially settled, activated sewage from the settling tank to the aeration channel. Substantially pure water, suitable for irrigation purposes, is removed from the surface of the liquid in the settling tank by means of a weir trough adjustably located in the upper portion of the settling tank.

Further objects and advantages and a better understanding of the present invention may be had by reference to the following detailed description taken in connection with the accompanying drawings, wherein:

FIG. 2 is a perspective view of a portion of FIG. 1 particularly showing that aspect of the invention wherein one of the aerating discs functions to recirculate liquid from the central settling tank to the annular aerobic treating channel; and FIG. 3 is a sectional view particularly illustrating the manner in which the weir trough is mounted.

Figure 1:
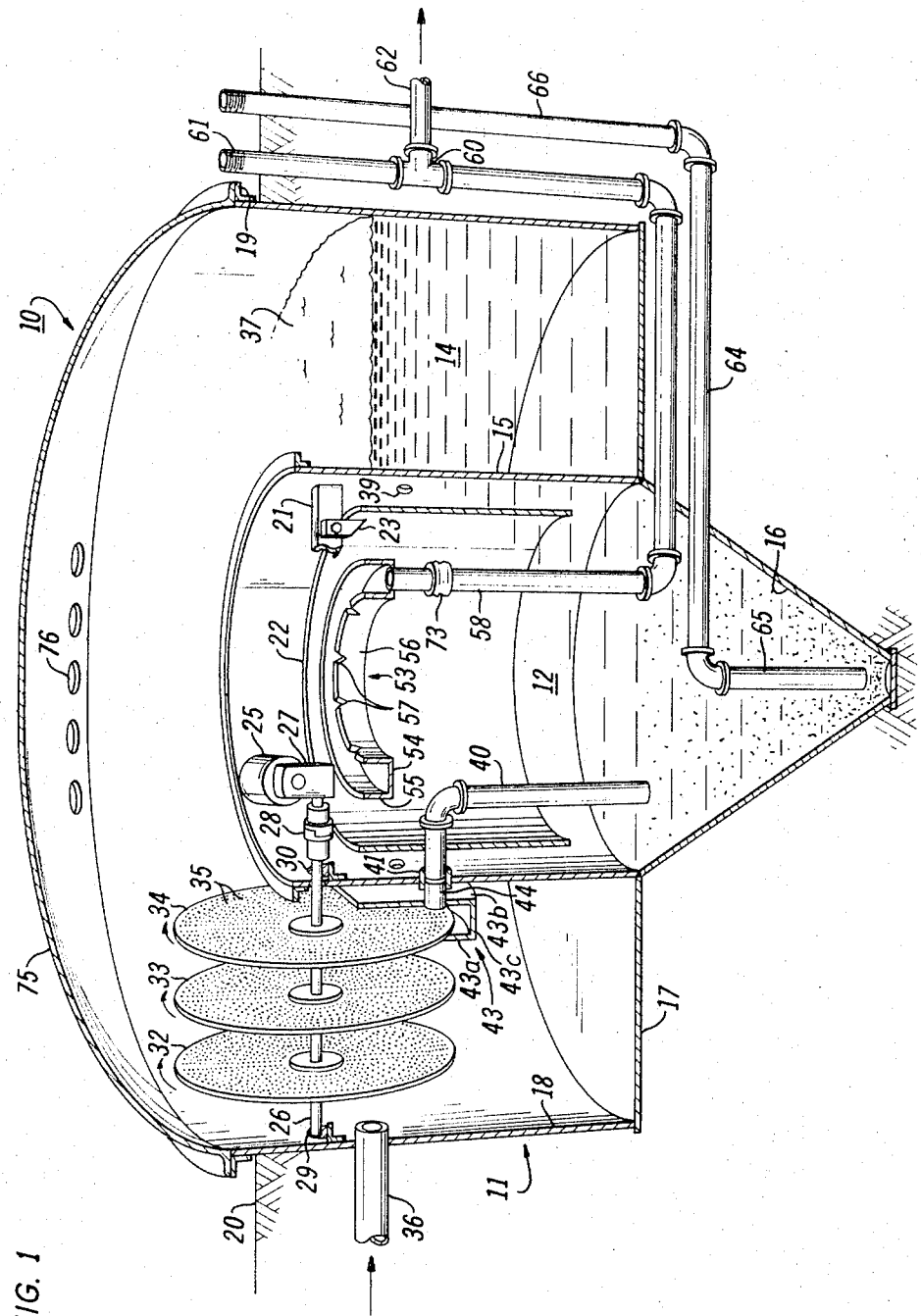
FIG. 1 is a sectioned, perspective view, partly schematic, showing a complete sewage treatment plant embodying the present invention.

Referring now to the drawings and more particularly to FIG. 1 thereof, a self-contained package type sewage treatment plant is identified by the numeral 10 and comprises a tank 11 having a centrally disposed settling tank section 12 surrounded by an annular, aerobic biological treating channel 14. The settling tank portion 12 includes a cylindrical upstanding wall 15 and a generally conical lower wall portion 16 into which the heavy mud-like activated sludge settles. As is evident from an inspection of the drawing, the conical wall 16 is below the channel 14. The channel 14 including a flat, annular bottom wall 17, an upstanding cylindrical wall 18 and the cylindrical wall 15 which forms the outer wall of the upper settling tank 12 and the inner wall of the aeration channel 14. Preferably, the walls 15, 16, 17 and 18 are formed of sheet steel and are welded together where they mutually abut. An annular flange 19 is provided along the top edge of the wall 18 and a similar flange is provided along the top edge of the wall 15. The tank 11 is adapted to be mounted in the ground with the top of the tank 18 lying at or slightly above ground level as indicated at 20. If desired, the channel portion 14 may be mounted entirely or partly above ground level.

A pair of crossbeams 21, suitably formed by channel stock, extend across the upper portion of the settling tank 12 and are secured at their ends as by welding to the upper portion of the cylindrical wall member 15 above the normal level of liquid therein. A cylindrical baffle 22 is suspended from the crossarms 21 by means of a plurality of suitable brackets 23 which are bolted to the crossarms 21 and welded to the baffle 22. As shown, the baffle 22 is relatively short and terminates a substantial distance above the bottom of the channel 14. An electric motor 25 is mounted on the crossarms 21 and drives a shaft 26 through an adjustable speed reducer 27 and a coupling 28. The shaft 26 is journaled at its distal end in a bushing 29 suitably mounted on the inner surface of the wall member 18 and is journaled near its other end in a bearing 30 mounted on the inner surface of the wall member 18 and is journaled near its other end in a bearing 30 mounted on the inner surface of the wall 15 over a suitable opening therein through which the shaft 26 extends. Preferably, the motor 25 is a constant speed motor, and therefore, the transmission 27 is used to adjust the speed of rotation of the shaft 26 to provide the necessary degree of aeration for the particular application of the plant 10.

A plurality of rigid discs 32, 33, and 34 are fixedly mounted on the shaft 26 so as to rotate in parallel vertical planes and to depend a short distance into the aeration channel 14. The discs are provided with a plurality of perforations 35 arranged substantially throughout their entire facial areas.

Raw sewage is supplied to the channel 14 through an inlet pipe 36 which extends through the wall 18 a short distance below the shaft 26. While the level of sewage in the channel 14 will vary, for proper operation of the system the level should be a substantial distance, of at least a few inches, above the bottoms of the discs 32, 33, and 34. As shown in FIG. 1, the level in the channel 14 is indicated at 37 and is slightly below the inlet port 36. The level in the central settling tank 12 will be about the same. It should be understood that the liquid and solids in the channel 14 continually undergo substantial turbulence so that the surface 37 is not smooth as shown. However, the liquid in the central section 12, and particularly within the baffle 22, is quiescent.

As indicated above, the channel 14 is an aerobic biological treating channel and as the sewage circulates in the channel, the aerobic micro-organisms act thereon to remove biological matter therefrom and thereby purify the remaining liquid. A plurality of spacially arranged circular holes 39 are provided in the wall 15 between the channel 14 and the settling tank 12 a short distance below the inlet port 36 so that as the sewage travels around the channel 14, some of it passes through the openings 39 into the settling tank 12. This sewage which passes through the openings 39 into the settling tank 29 has been activated in the sense that it contains aerobic micro-organisms and it includes both liquid and entrained solids. In passing through the holes 39, the solids are further broken up as they move against the edges of the holes. The liquid and entrained solids in the tank 12 are in a relatively quiet state whereby the heavy solids sett'e into the conical bottom and the purified, lighter liquid, which is relatively pure water, floats to the top. The baffle 22 maintains the upper, central portion of the liquid in the settling section 12 is a relatively still, quiet state.

In order to maintain a proper balance of sewage and aerobic biological organisms in the channel 14 to encourage the continuance of the aerobic treating process and to improve the efficiency of operation of the system, the partially settled liquid in the settling tank 12 is continually recirculated into the channel 14 below the sewage level therein. For this purpose, a pipe 40 extends through and is supported by the baffle member 22 and a connector 41 fixedly mounted in an opening in the wall 15 opposite the corresponding opening in the baffle 22 through which the pipe 40 extends. The lower end of the pipe 40 terminates at approximately the level of the bottom of the channel 14. A trough 43 formed of semi-circular side walls 43a and 43b and a bottom wall 43c is fixedly mounted on a short length of pipe 44 which extends into and is rotatable in the connector 41 so that the trough 43 is pivotable about the axis of the pipe 44. It will be noted from inspection of FIG. 2 that the passage in the pipe 44 connects to the passage in the pipe 40 and opens into the trough 43 in close proximity to one face of the disc 34 near the bottom thereof.

In order to adjust the angle of the trough 43 and thus the angular extent to which it covers the disc 34, a bracket 46 is fixed, as by welding, to the trough wall 43b near one edge thereof and extends upwardly to provide a convenient handle for adjusting the angle of the trough 43. In order to hold the trough in the adjusted position, a bolt 48 extends from the bracket 46 through an arcuate slot 49 in a bracket 50 which is fixedly mounted to the wall 15 by means of a length of angle iron 51 welded to the bracket 50 and to the wall 15.

The trough 43 encloses the lower portion of the inner disc 34 and the wall 43b is disposed closely adjacent to the face of the disc 34 whereby the disc 34 functions as a pump impeller thereby to pump activated sewage from the tank 12 through the pipes 40 and 41 and from the trough 43 into the channel 14. By adjusting the angle of the trough 43, the amount of activated sewage which is recirculated to the aerobic treating channel 14 is controlled.

In order to remove the relatively pure water from the inner portion of the settling tank 12, an annular weir trough 53 is provided. The weir trough 53 has a bottom wall 54, an upstanding cylindrical outer wall 55, and an upstanding cylindrical inner wall 56 provided with a plurality of spaced apart V-shaped notches 57 along the upper edge and through which the surface liquid from the settling tank 12 flows into the weir trough 53. A liquid outlet line 58 connects to the bottom of the trough 53 and extends through the wall 16, along the underside of the wall 17 and upwardly along the outer side of the tank 11. A T-connector 50 is provided in the line with a standpipe 61 being connected to one leg of the T and opening above ground level 20. A water effluent line 62 is connected to the other leg of the tee and may conveniently go to a water retention tank used to store water for irrigation.

A sludge removal line 64 is connected between the bottom of the settling tank 12 and ground level and includes a vertical bottom portion 65 opening near the bottom of the settling tank, a substantially vertical portion 66 extending along the side of the tank 11 to the surface, and an intermediate portion interconnecting the two vertical portions. Periodically, as, for example, once every two years, a pump may be connected to the line 66 to pump the sludge from the settling tank 12. The sludge may then be placed in a drying bed or the like to be used later for fertilizing purposes.

The weir trough 53 is supported from the crossarms 21 on four threaded studs 68 which are respectively welded to the inner trough wall 56 and extend upwardly through brackets 69 welded to the crossarms 21. Nuts 70 and 71 threaded on the stud 68 above and below each bracket enable adjustment of the vertical height of the weir trough 53 in the settling tank so that only clear water flows through the notches 57 into the trough. An expandable connector 73 is provided in the line 58 to permit such adjustment. The expandable connector 73 may, if desired, be replaced with a telescoping connection.

Should it be desired to cover the tank 11, a dome-like cover 75 suitably apertured such, for example, as shown at 76 may be positioned on top of the tank 11.

OPERATION

In operation, the motor 25 is continuously energized to drive the discs 32–34 at a constant speed of rotation to introduce air into the sewage contained in the aeration channel 14. It will be apparent that the greater the depth of liquor in the channel 14 the greater the depth of immersion of the discs therein and, consequently, the greater the amount of air introduced into the liquid. The maximum depth of liquor in the tank is determined by the location Of the weir trough 53 and under optimum operating conditions the amount of clear water exiting the settling tank will equal the amount of sewage entering through the inlet 36.

In addition to introducing air into the liquor, the discs circulate the liquor around the channel 14 and violently agitate it so that there is substantial turbulence in the channel. This constant circulation and turbulence breaks up the air bubbles introduced into the liquor by the aperture 35 in the discs and moves the air throughout the entire channel thereby to greatly enhance the activity and growth of the aerobic organisms contained therein.

As the liquor circulates around the channel 14 some of it passes through the openings 39 into the centrally disposed settling or sludge tank 12. In the tank 12, the liquor is in a substantially quiescent state and the heavier solids gradually settle to the bottom with the clear, purified water rising to the top. The smaller and less dense solids remain in the middle part of the settling tank. Liquid and entrained solids from a location about one-third of the way up from the bottom of the tank 12 is returned via the pipe 40 to the channel 14.

The angular position of the trough 43 is adjusted so as to recirculate a sufficient amount of the activated sludge to the channel 14 to maintain an active colony of aerobic organisms in the channel 14 and to provide a layer of substantially pure, clear water at the top of the tank 12. By locating the inlet to the pipe 40 close to or within the conical bottom of the tank 12 the recirculated liquor contains a high percentage of activated sludge particles while the liquid in the upper part of the tank 12 remains quite still.

It will be apparent that the angle to which the trough 43 should be adjusted is dependent upon the level of sewage in the aerobic treating channel 14. Since this level may vary from time to time, as for example, when the associated sewage system is not used to the normal extent, the trough may, for most efficient operation, be periodically adjusted.

Also, where the treating plant of the present invention is being used to replace an existing septic system, the line 62 may be connected to the septic tank which will then serve as a water reservoir from which water may later be pumped for irrigation purposes.

While the particular dimensions of the various parts of the system 10 will vary depending upon the type and amount of sewage to be treated, the following data is illustrative of a system designed for use with a population of six or seven persons living in two adjacent homes:

| | |
|---|---|
| Depth of Wall 15 | 3 feet |
| Diameter of Wall 15 | 5 feet |
| Diameter of Wall 18 | 9 feet |
| Depth of Baffle 22 | 2.5 feet |
| Height of Cone 16 | 2 feet |
| Average Liquid Depth in Channel 14 | 2 feet |
| Liquid in Channel 14 | 660 gallons |
| Liquid in Tank 12 Above Cone 16 | 300 gallons |
| G.P.D. for 24-hour Aeration | 660 gallons |
| Average Detention Time in Tank 12 Above Cone | 10.9 hours |
| Sludge Storage in Cone | 100 gallons |
| Diameter of Discs 32-34 | 2.5 feet |
| Thickness of Discs 32-34 | 0.75 inch |
| Number of Holes 35 | 1050 |
| Diameter of Holes | 0.5 inch |
| Holes Located in 8-inch Wide Outer Band | |
| Speed of Discs 32-34 | 45 to 56 r.p.m. |
| Depth of Immersion of Discs 32-34 | 8 inches average 10 inches maximum |
| Electric Motor 25 | 1/3 H.P. |

While the present invention has been described in connection with particular embodiments thereof, it will be understood that many changes and modifications of this invention may be made by those skilled in the art without departing from the true spirit and the scope thereof. Accordingly, the appended claims are intended to cover all such changes and modifications as fall within the true spirit and scope of the present invention.

I claim:

1. A sewage treatment plant of the package type, comprising
    a settling tank having a conical bottom wall portion and an upper, cylindrical wall portion,
    an annular channel surrounding said upper wall portion with said upper wall portion being the inner wall of said channel,
    said upper wall portion having a plurality of openings therein for transferring sewage from said channel to said settling tank,
    a circular disc having perforations therein,
    a horizontally disposed shaft journaled above said channel and on which said disc is fixed to depend into said channel and be partially submerged in the sewage carried thereby,
    a semi-circular trough mounted in said channel over the lower portion of said disc,
    a pipe connected between said trough and the lower portion of said tank,
    motor means for rotating said disc to aerate the sewage in said channel and to recirculate sewage from said tank to said channel, and
    weir means mounted near the top of said tank for removing clarified liquid therefrom.

2. A sewage treatment plant according to claim 1 further comprises
    means pivotally mounting said trough in said channel to adjust the rate at which sewage is recirculated by said disc.

3. A sewage treatment plant according to claim 2 wherein
    said trough is pivotally mounted on said pipe whereby said sewage enters said trough along the pivotal axis thereof.

* * * * *